(12) United States Patent
Iwakiri (10) Patent No.: US 7,932,500 B2
(45) Date of Patent: Apr. 26, 2011

(54) RADIATION IMAGE DETECTION METHOD AND APPARATUS

(75) Inventor: Naoto Iwakiri, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 596 days.

(21) Appl. No.: 12/058,737

(22) Filed: Mar. 30, 2008

(65) Prior Publication Data

US 2008/0237479 A1    Oct. 2, 2008

(30) Foreign Application Priority Data

Mar. 29, 2007  (JP) ................................ 2007-087012

(51) Int. Cl.
*G01T 1/24*    (2006.01)
(52) U.S. Cl. .............. 250/370.08; 250/370.07; 250/371; 378/207; 378/98.11
(58) Field of Classification Search ......... 250/370.01–370.15; 378/989, 378/19, 116, 141, 142, 189, 190, 196–199, 378/98.11, 207; 327/94, 93; 348/243
See application file for complete search history.

(56) References Cited

U.S. PATENT DOCUMENTS

| | | | | |
|---|---|---|---|---|
| 6,453,008 | B1 * | 9/2002 | Sakaguchi et al. | 378/98.7 |
| 6,633,135 | B2 * | 10/2003 | Nara et al. | 315/169.3 |
| 7,122,803 | B2 * | 10/2006 | Jing et al. | 250/370.09 |
| 2005/0061987 | A1 * | 3/2005 | Watadani et al. | 250/370.08 |
| 2006/0056588 | A1 * | 3/2006 | Endo | 378/62 |
| 2007/0170351 | A1 * | 7/2007 | Partain et al. | 250/214 C |

FOREIGN PATENT DOCUMENTS

JP    2003-319264 A    11/2003

* cited by examiner

*Primary Examiner* — David P Porta
*Assistant Examiner* — Yara B Green
(74) *Attorney, Agent, or Firm* — Sughrue Mion, PLLC

(57) ABSTRACT

A radiation image detection method including the steps of: detecting from a radiation image detector including multitudes of pixels disposed two-dimensionally, each having a TFT switch, an analog image signal of each pixel flowing out through each data line by sequentially switching ON the TFT switches connected to each scanning line on a scanning line-by-scanning line basis; detecting an analog leak level flowing out through each data line with the TFT switches connected to each of the scanning lines being switched OFF each time before switching ON the TFT switches on a scanning line-by-scanning line basis when converting the detected analog image signal to a digital image signal and outputting; and correcting the analog image signal before being converted to the digital image signal based on the leak level.

4 Claims, 9 Drawing Sheets

RADIATION IMAGE DETECTION METHOD AND APPARATUS

BACKGROUND OF THE INVENTION

1. Field of the Invention

The present invention relates to a radiation image detection method and apparatus for detecting a radiation image from a radiation image detector which includes multitudes of pixels, each having a TFT switch, disposed two-dimensionally.

2. Description of the Related Art

Radiation image detection systems having a TFT (Thin Film Transistor) active matrix array on which a radiation sensitive layer is disposed are known. Such systems are capable of tentatively storing latent image charges generated according to radiation transmitted through a subject and reading out the stored latent image charges as electrical signals, and have an advantage over conventional imaging plates using a storage phosphor in that they allow instantaneous image verification and motion image monitoring, so that they are spreading rapidly.

Figure 8:
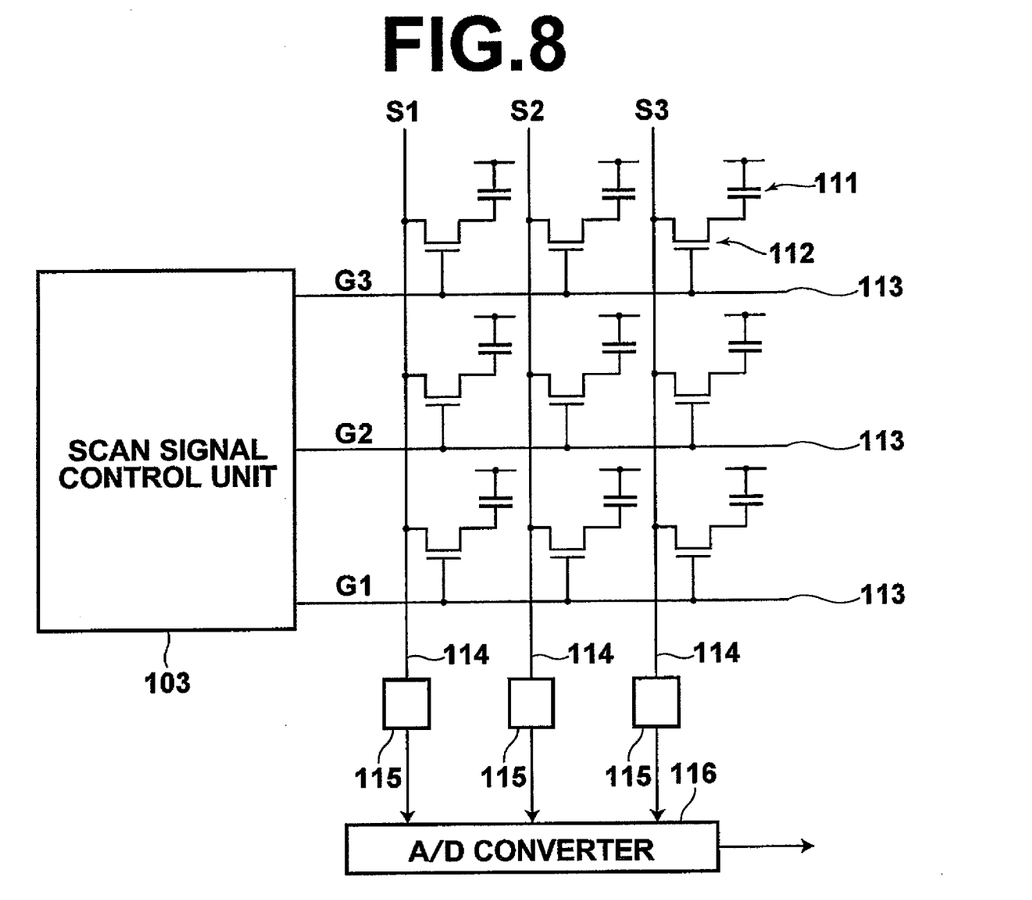
FIG. 8 is a schematic configuration diagram of a conventional radiation image detector.

First, the structure of a conventional radiation image detection system will be described with reference to FIG. 8. FIG. 8 is a schematic equivalent circuit of 3×3 pixels. In FIG. 8, the reference numerals 111, 112, 113, and 114 respectively denote a capacitor, a TFT switch, a scanning line, and a data line.

Radiation, such as X-rays or the like, enters from a direction normal to the surface of FIG. 8, which is converted to electrical signals by the photoelectric conversion elements and the charges thereof are stored in the capacitor 111 of each pixel. Thereafter, the TFT switches 112 are sequentially activated by the scanning lines 113 to transfer the stored charges to the data lines 114 connected to either one of the source/drain electrodes of the TFT switches 112, and the signals flowing out through the data lines are detected by the signal detectors 115, which are then converted to digital signals by the A/D converter 116 and outputted.

In such type of radiation image detection system, there may be cases in which various types of noise are added to the essential image signals to be detected due to various reasons. For example, one type of noise is caused by leak current of the TFT switch. It is preferable that no leak current flows through the TFT switch that selects a pixel to be detected while it is in OFF state. But, irradiation of a larger amount of X-rays causes a larger amount of charges to be generated in the charge generation layer, which causes the drain voltage to become high, resulting in a large amount of leak current to flow and added to the image signals. In order to solve this problem, for example, Japanese Unexamined Patent Publication No. 2003-319264 proposes a method in which the leak current is read out while the TFT switches are in OFF state, and digital image signals are corrected using the leak current value.

The method described in the aforementioned patent publication, however, reduces, in effect, a usable dynamic range. More specifically, the image signal correction is performed using a process for subtracting the leak current component from the obtained digital image signal, so that the possible value range of the corrected image signal is reduced by the amount corresponding to the amount of the leak current from the dynamic range at the output of the A/D converter. This causes a problem, in particular, where a large amount of X-rays is irradiated, since the leak current becomes great in such a case.

In view of the circumstances described above, it is an object of the present invention to provide a radiation image detection method and apparatus capable of appropriately correcting the image signal by the amount corresponding to the amount of the error caused by leak currents, and preventing the reduction in the dynamic range of the image signal after correction.

SUMMARY OF THE INVENTION

The radiation image detection method of the present invention is a method for detecting from a radiation image detector including a charge generation layer that generates charges by receiving radiation and a detection layer stacked on top of another, the detection layer including: multitudes of pixels, each having a collection electrode for collecting the charges generated in the charge generation layer, a capacitor for storing the charges collected by the charge collection electrode, and a TFT switch for reading out the charges stored in the capacitor; multitudes of scanning lines for switching ON/OFF the TFT switches; and multitudes of data lines for transferring the charges stored in the capacitors, an analog image signal of each of the pixels flowing out through each of the data lines by sequentially switching ON the TFT switches connected to each of the scanning lines on a scanning line-by-scanning line basis, and converting the detected analog image signal to a digital image signal and outputting, wherein the method further includes the steps of:

detecting an analog leak level flowing out through each of the data lines with the TFT switches connected to each of the scanning lines being switched OFF each time before switching ON the TFT switches on a scanning line-by-scanning line basis; and correcting the analog image signal based on the leak level prior to the conversion.

The radiation image detection apparatus of the present invention is an apparatus including:

a radiation image detector including a charge generation layer that generates charges by receiving radiation and a detection layer stacked on top of another, the detection layer including: multitudes of pixels, each having a collection electrode for collecting the charges generated in the charge generation layer, a capacitor for storing the charges collected by the charge collection electrode, and a TFT switch for reading out the charges stored in the capacitor; multitudes of scanning lines for switching ON/OFF the TFT switches; and multitudes of data lines for transferring the charges stored in the capacitors;

an image signal detection means that detects an analog image signal of each of the pixels flowing out through each of the data lines from the radiation image detector by sequentially switching ON the TFT switches connected to each of the scanning lines on a scanning line-by-scanning line basis;

an analog/digital conversion means that converts the detected analog image signal to a digital image signal;

a leak level detection means that detects an analog leak level flowing out through each of the data lines with the TFT switches connected to each of the scanning lines being switched OFF each time before the TFT switches are switched ON on a scanning line-by-scanning line basis; and a correction means that corrects the analog image signal based on the leak level prior to the conversion.

In the radiation image detection apparatus of the present invention, the correction means may be a means that subtracts the leak level detected from each of the data lines with the TFT switch of each of the pixels connected thereto being switched OFF before the TFT switch is switched ON from the analog image signal of each of the pixels.

Further, the image signal detection means may be a means that detects the analog image signal of each of the pixels by comparing a signal flowing out through each of the data lines when the TFT switches connected to each of the scanning lines are sequentially switched ON on a scanning line-by-scanning line basis with a predetermined reference voltage; and the correction means is a means that control the reference voltage based on the analog leak level detected from each of the data lines to which each of the pixels are connected with the TFT switch thereof being switched OFF before the TFT switch is switched ON.

According to the radiation image detection method and apparatus, which is a method and apparatus for detecting from a radiation image detector including a charge generation layer that generates charges by receiving radiation and a detection layer stacked on top of another, the detection layer including: multitudes of pixels, each having a collection electrode for collecting the charges generated in the charge generation layer, a capacitor for storing the charges collected by the charge collection electrode, and a TFT switch for reading out the charges stored in the capacitor; multitudes of scanning lines for switching ON/OFF the TFT switches; and multitudes of data lines for transferring the charges stored in the capacitors, an analog image signal of each of the pixels flowing out through each of the data lines by sequentially switching ON the TFT switches connected to each of the scanning lines on a scanning line-by-scanning line basis, and converting the detected analog image signal to a digital image signal and outputting, an analog leak level flowing out through each of the data lines is detected with the TFT switches connected to each of the scanning lines being switched OFF each time before the TFT switches are switched ON on a scanning line-by-scanning line basis and the analog image signal is corrected based on the leak level prior to the conversion. This allows the amount of error in the image signal caused by the leak currents may be corrected properly, and at the same time the reduction in the dynamic range of the corrected image signal may be prevented.

Further, if the correction means is a means that subtracts the leak level detected from each of the data lines with the TFT switch of each of the pixels connected thereto being switched OFF before the TFT switch is switched ON from the analog image signal of each of the pixels, the amount of error in the image signal of each of the pixels may be corrected properly.

Still further, if the image signal detection means is a means that detects the analog image signal of each of the pixels by comparing a signal flowing out through each of the data lines when the TFT switches connected to each of the scanning lines are sequentially switched ON on a scanning line-by-scanning line basis with a predetermined reference voltage, and the correction means is a means that control the reference voltage based on the analog leak level detected from each of the data lines to which each of the pixels are connected with the TFT switch thereof being switched OFF before the TFT switch is switched ON, an error corrected image signal may be obtained by estimating the amount of error in the image signal caused by the leak currents in advance, and controlling the reference voltage used for the image signal detection.

DESCRIPTION OF THE PREFERRED EMBODIMENTS

Hereinafter, an embodiment of the radiation image detection apparatus of the present invention will be described with reference to the accompanying drawings.

Figure 1:
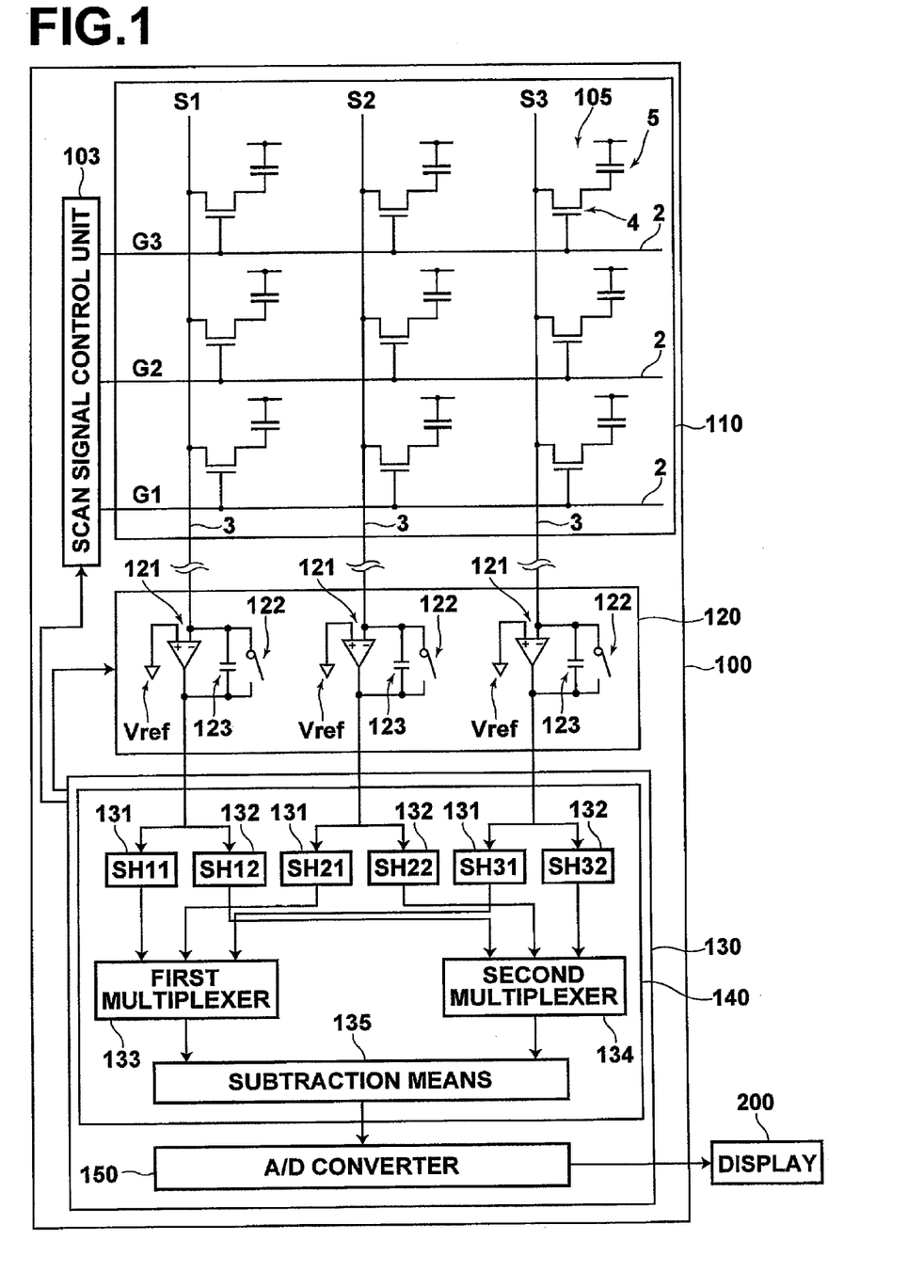
FIG. 1 is a schematic configuration diagram of a first embodiment of the radiation image detection apparatus of the present invention.

A schematic configuration of the radiation image detection apparatus according to an embodiment of the present invention is illustrated in FIG. 1. The illustrated radiation image detection apparatus 100 includes: a radiation image detector 110; a signal detection section 120 that detects analog image signals outputted from the radiation image detector 110 and analog leak levels; a scan signal control unit 103 that outputs scan signals to scanning lines (gate electrodes) 2 of the radiation image detector 110; and a signal processing unit 130 that obtains the signals detected by the signal detection section 120 and outputs the signals to a display 200 as video signals, and outputs control signals to the scan signal control unit 103 and signal detection section 120.

The radiation image detector 110 includes multitudes of pixels disposed two-dimensionally, each including: an image sensor section 105 having a bias electrode, a semiconductor film of charge generation layer, and a charge collection electrode, to be described later; a capacitor 5 for storing charge signals detected by the image sensor section 105; and a TFT switch 4 for reading out the charges stored in the capacitor 5. In addition, multitudes of scanning lines (gate electrodes) 2 for switching ON/OFF the TFT switches 4 and multitudes of data lines (source electrodes) 3 for transferring the charges stored in the capacitors 5 are provided.

The signal processing section 130 includes: a leak error correction means 140 that performs correction on analog image signals detected by the signal detection section 120 based on leak levels also detected by the signal detection section 120; and an A/D converter 150 for converting analog image signals corrected by the leak error correction means 140 to digital image signals.

Figure 2:
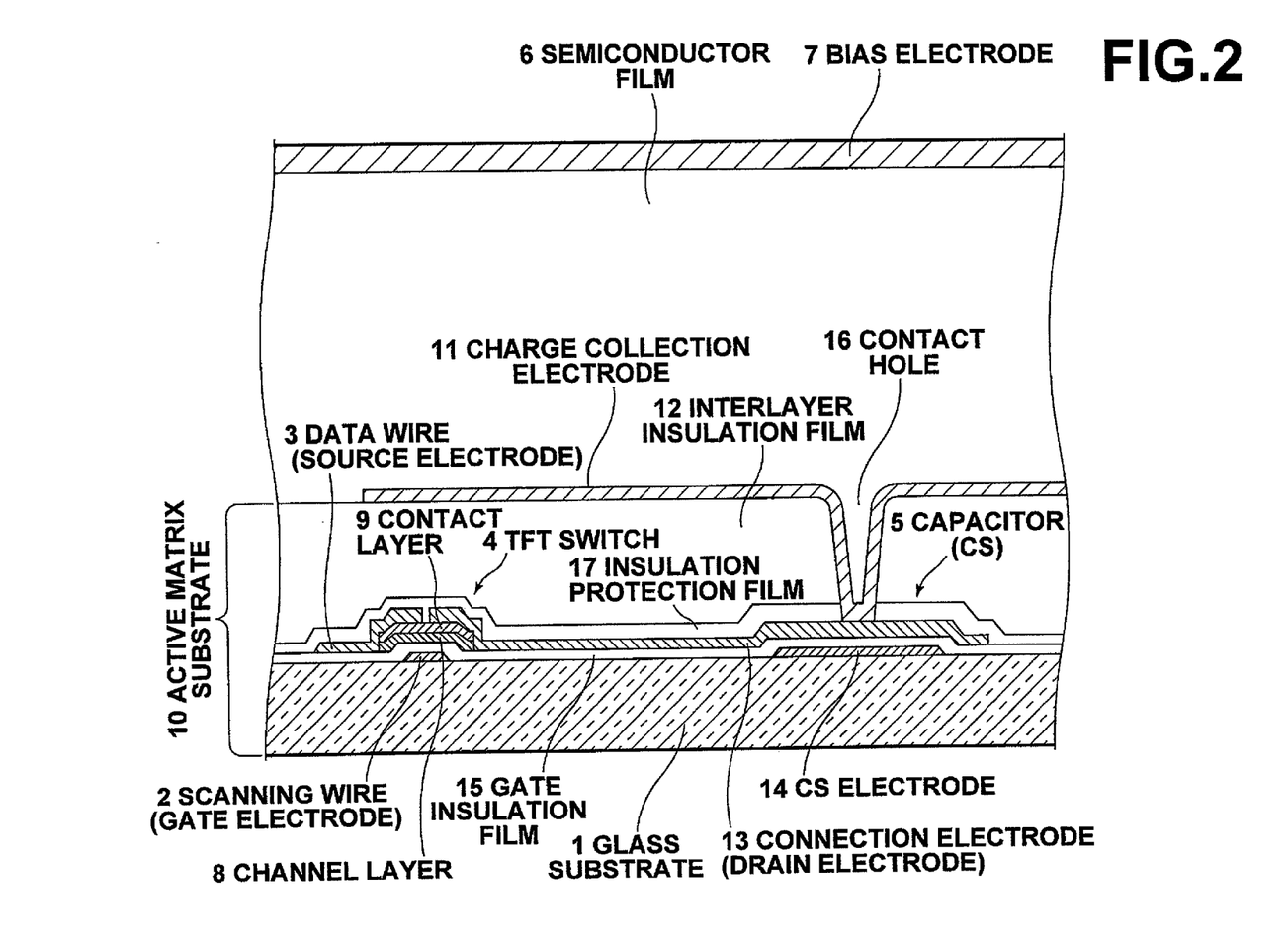
FIG. 2 a cross-sectional view of the radiation image detector shown in FIG. 1, illustrating the structure of a single pixel.
Figure 3:
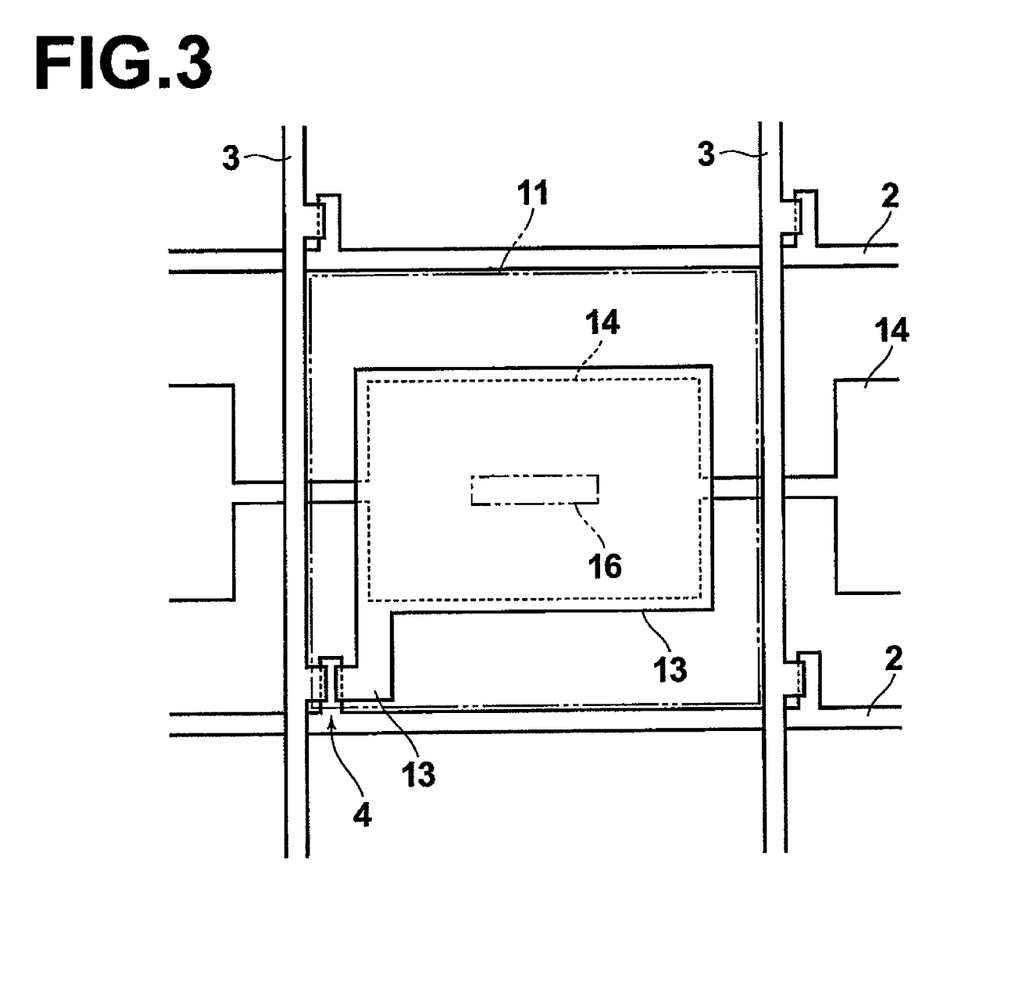
FIG. 3 is a plan view of the radiation image detector shown in FIG. 1, illustrating the structure of a single pixel.

Now, the radiation image detector 110 will be described in more detail. FIG. 2 is a cross-sectional view of the radiation image detector 110, illustrating the structure of a single pixel, and FIG. 3 is a plan view thereof.

As illustrated in FIG. 2, the radiation image detector 110 includes an active matrix substrate 10 on which a semiconductor film 6 having electromagnetic conductivity, and a bias electrode (common electrode) 7 connected to a not shown high voltage power source are stacked in this order. The semiconductor film 6 generates charges (electron-hole pairs) when irradiated with an electromagnetic wave, such as X-rays or the like. That is, the semiconductor film 6 has electromagnetic conductivity, and provided for converting image information represented by X-rays to charge information. The semiconductor film 6 is, for example, made of selenium-based amorphous a-Se (amorphous selenium). The referent of "selenium-based" as used herein means that selenium is included 50% or more.

Hereinafter, the active matrix substrate 10 will be described in more detail.

The active matrix substrate 10 includes a glass substrate 1, a scanning line (gate electrode) 2, a capacitor electrode (Cs electrode) 14, a gate insulation film 15, a connection electrode 13, a channel layer 8, a contact layer 9, a data line (source electrode) 3, an insulation protection film 17, and an interlayer insulation film 12.

The thin film transistor (TFT) 4 is formed by the gate insulation film 15, connection electrode 13, channel layer 8, contact layer 9, and the like, and the capacitor (Cs) 5 is formed by the Cs electrode 14, gate insulation film 15, connection electrode 13, and the like.

The glass substrate 1 is the supporting substrate and, for example, non-alkali glass may be used for this purpose. The scanning lines 2 and data lines 3 are electrode wires disposed in a grid pattern, and the thin film transistor (TFT switch) 4 is formed at each intersection thereof. The TFT switch 4 is a switching element, and the source and drain thereof are connected to the data line 3 and connection electrode 13 respectively. The data line 3 is the source electrode and the connection electrode 13 is the drain electrode of the TFT switch 4. That is, the data line includes a linear portion serving as the signal line and an extended portion for forming the TFT switch 4. The connection electrode 13 is provided to connect the TFT switch 4 with the capacitor 5.

The gate insulation film 15 is made of SiNx, SiOx, or the like. The gate insulation film 15 is disposed to cover the scanning line 2 and Cs electrode 14, and the portion located over the scanning line 2 acts as the gate insulation film of the TFT switch 4, and the portion located over the Cs electrode 14 acts as the dielectric layer of the capacitor 5. That is, the capacitor 5 corresponds to the region where the Cs electrode 14, which is formed on the same layer as the scanning line 2, and the connection electrode 13 are stacked on top of another. It is noted that an anodized oxide film obtained by anodizing the scanning line 2 and Cs electrode 14 may also be used in combination with SiNx or SiOx for the gate insulation film 15.

The channel layer (i layer) 8 corresponds to the channel section of the TFT switch 4, which is a current channel for connecting between the data line 3 and connection electrode 13. The contact layer (n$^+$ layer) 9 provides a contact between the data line 3 and connection electrode 13.

The insulation protection film 17 extends substantially the entire surface (area) over the data line 3 and connection electrode 13, i.e., over the glass substrate 1. The insulation protection film 17 provides electrical insulation between the data line 3 and connection electrode 13, as well as protecting them. The insulation protection film 17 has a contact hole 16 at a predetermined position, i.e., the position over the portion of the connection electrode 13 facing the Cs electrode 14 across the capacitor 5.

The charge collection electrode 11 is made of a transparent conductive amorphous oxide film. The charge collection electrode 11 is formed to fill the contact hole 16 and stacked over the data line 3 and connection electrode 13. The charge collection electrode 11 is electrically communicating with the semiconductor film 6 so as to be able to collect charges generated in the semiconductor film 6.

The interlayer insulation film 12 is made of an acrylic resin having photosensitivity and provides electrical insulation for the TFT switch 4. The contact hole 16 runs through the interlayer insulation film 12, and the charge collection electrode 11 is connected to the connection electrode 13.

The scanning line 2 and Cs electrode 14 are provided on the glass substrate 1. The channel layer (i layer) 8 and contact layer (n$^+$ layer) 9 are stacked in this order over the scanning line 2 via the gate insulation film 15. The data line 3 and connection electrode 13 are formed on the contact layer 9. The connection electrode 13 is stacked over the layer forming the capacitor 5. The insulation protection layer 17 is disposed on the connection electrode 13 and data line 3.

The interlayer insulation film 12 of the TFT switch 4 is provided on the insulation protection layer 17. The charge collection electrode 11 is provided in the upper layer of the interlayer insulation film 12, i.e., the uppermost layer of the active matrix substrate 10. The charge collection electrode 11 is connected to the TFT switch 4 through the connection electrode 13.

The gate insulation film 15 is provided on the Cs electrode 14, and the connection electrode 13 is disposed on the gate insulation film 15. The charge collection electrode 11 is connected to the connection electrode 13 through the contact hole 16 running through the interlayer insulation film 12.

A not shown high voltage power source is connected between the bias electrode 7 and Cs electrode 14. A voltage is applied between the bias electrode 7 and Cs electrode 14 by the high voltage power source, which causes an electric field to be generated between the bias electrode 7 and Cs electrode 14 across the capacitor 5. Here, the semiconductor film 6 and capacitor 5 are electrically connected in series, so that when a bias voltage is applied to the bias electrode 7, charges (electron-hole pairs) are generated in the semiconductor film 6. The electrons generated in the semiconductor film 6 are moved to the positive electrode side and holes are moved to the negative electrode side, causing charges to be stored in the capacitor 5.

The entire radiation image detector 101 includes a plurality of charge collection electrodes 11 disposed two-dimensionally, a plurality of capacitors 5, each connected to each charge collection electrode 11, and a plurality of TFT switches 4, each connected to each capacitor 5. This allows two-dimensional electromagnetic information to be tentatively stored in the capacitors 5, and the two-dimensional charge information may be read out easily by sequentially scanning the TFT switches 4.

An example manufacturing process of the radiation image detector will now be described.

First, a metal film of Ta, Al, or the like is formed on the glass substrate 1 by sputter deposition with a thickness of approximately 300 nm, and the scanning lines 2 and Cs electrodes 14 are formed by patterning the film in a desired shape.

Next, the gate insulation film 15 made of SiNx, SiOx, or the like is formed substantially over the entire surface of the glass substrate 1 with a thickness of approximately 350 nm by CVD (Chemical Vapor Deposition) so as to cover the scanning lines 2 and Cs electrodes 14. It is noted that an anodized oxide film obtained by anodizing the scanning lines 2 and Cs electrodes 14 may also be used in combination with SiNx or SiOx for the gate insulation film 15.

Then, amorphous silicon (a-Si) film is formed by CVD with a thickness of approximately 100 nm such that the channel layers 8 are disposed over the scanning lines 2 via the gate insulation film 15, and the channel layers 8 are formed by patterning the film in a desired shape.

Next, a-Si film is formed by CVD with a thickness of approximately 40 nm such that the contact layers 9 are disposed in the upper layer of the channel layers 8, and the contact layers 9 are formed by patterning the film in a desired shape.

Further, a metal film of Ta, Al, or the like is formed on the contact layers 9 with a thickness of approximately 300 nm, and data lines 3 and connection electrodes 13 are formed by patterning the film in a desired shape.

Then, in order to form the insulation protection film 17, a SiNx film substantially covering the entire region of the glass substrate 1, having the TFT switches 4, capacitors 5, and the like formed thereon, is formed by CVD with a thickness of approximately 300 nm. Thereafter, the SiNx film formed on a predetermined portion of the connection electrode 13 is removed to create a portion of the contact hole 16.

Next, in order to form the interlayer film 12, an acrylic resin film or the like having photosensitivity is formed with a thickness of approximately 3 μm to cover substantially the entire surface of the insulation protection film 17. Then, patterning is performed by photolithography technique to form a portion of the contact hole 16 by aligning with the portion of the contact hole 16 of the insulation protection film 17.

Then, a transparent conductive amorphous oxide film, such as ITO (Indium-Tin-Oxide) film, is formed on the interlayer insulation layer 12 by sputter deposition with a thickness of approximately 200 nm, and the charge collection electrodes 11 are formed by patterning the film in a desired shape. Here, each charge collection electrode 11 is electrically communicated (short-circuited) with each connection electrode 13 through each contact hole 16 running through the insulation protection layer 17 and interlayer insulation film 12.

In the present embodiment, the active matrix substrate 10 adopts a so-called roof structure (mushroom electrode structure) in which the charge collection electrode 11 overlaps with the TFT switch 4 on the upper side thereof as described above. But, a non-roof structure may also be adopted. Further, as the switching element, the TFT 4 using a-Si is employed, but p-Si (poly silicon) may also be used. Still further, although an inversely staggered structure in which the data lines 3 and connection electrodes 13 are positioned above the scanning lines 2 via the gate insulation film 15 is adopted, a staggered structure may also be employed.

Next, the semiconductor film 6 of a-Se (amorphous selenium) having conductivity for electromagnetic wave is formed to cover the entire pixel array region of the active matrix substrate 10 by vacuum deposition with a thickness of approximately 0.5 to 1.5 mm.

Finally, the bias electrode 7 of Au, Al, or the like is formed on substantially the entire surface of the semiconductor film 6 by vacuum deposition with a thickness of approximately 200 nm.

It is noted that a charge injection blocking layer for blocking electrons or holes from entering into the semiconductor film 6, or a buffer layer for improving contact between the semiconductor layer 6 and charge collection electrode 11 may be provided at the interface between the semiconductor layer 6 and charge collection electrode 11. Likewise, a charge injection blocking layer or a buffer layer may be provided at the interface between the semiconductor film 6 and bias electrode 7. As for the material of the charge injection blocking layer or buffer layer, a-Se including a-$As_2Se_3$, alkali element ion, or halogen element ion added thereto, or the like may be used.

Next, the operational principle of the radiation image detector 110 structured in the aforementioned manner will be described. When X-rays are irradiated on the semiconductor film 6 while a voltage is applied between the bias electrode 7 and Cs electrodes 14, charges (electron-hole pairs) are generated in the semiconductor film 6. The electrons generated in the semiconductor film 6 are moved to the positive electrode side and holes are moved to the negative electrode side, causing charges to be stored in the capacitors 5, since the semiconductor film 6 and each of the capacitors 5 are electrically connected in series.

Charges stored in each of the capacitors 5 may be read out to outside through the data line 3 by inputting a signal to the scanning line 2 and switching ON the TFT switch.

The scanning lines 2, data lines 3, TFT switches 4, and capacitors 5 are all provided in XY matrices, so that the image information represented by the X-rays may be obtained two-dimensionally by sequentially scanning the signal to be inputted to the scanning lines 2 and detecting charge signals from the data lines 3 by the signal detection section 120 with respect to each data lines.

It is preferable that the charges stored in the capacitor 5 do not flow into the data line 3 at all when the TFT switch 4 is in OFF state. When irradiating high-dose radiation, however, the charges are intentionally flowed out to the data line 3. This is because of the adoption of the roof structure (mushroom electrode structure) in which the charge collection electrode 11 overlaps with the TFT switch 4 on the upper side thereof as described above in order to prevent the TFT 4 from breakage arising from a large potential difference between the gate and source when high-dose radiation is irradiated. In the structure, when an excessive potential difference (about 60 to 100V) is developed, the charge collection electrode 11 overlapping with the TFT switch 4 functions as a pseudo top gate, thereby the TFT 4 is switched and the charges are caused to overflow into the data line 3. Thereby, the TFT is protected from breakage. In the present embodiment, the description has been made of a case in which the roof structure is adopted, but an alternative structure may also be adopted, in which a protective diode structure is employed in each pixel to cause the charges to overflow into the data line 3 when an excessive potential difference is developed. When such structures as described above are adopted, if a high-dose of X-rays is irradiated onto each pixel, a certain amount of leak current (overflow current) flows out into the data line 3, and a leak level, which is the sum of the leak currents of all of the TFT switches 4 connected to a single data line 3, is detected. Further, the leak level is superimposed on the image signal detected through the data line 3 by selectively switching ON the TFT switches 4.

The signal detection section 120 detects analog leak levels L outputted from the radiation image detector 110 with the TFT switches 4 being switched OFF and analog image signals R outputted from the radiation image detector 110 with the TFT switches 4 being selectively switched ON by making comparison with a reference voltage Vref, and includes a plurality of differential amplifiers 121, each connected to each data line 3. Each differential amplifier 121 is a charge amplifier and includes a reset switch 122 and an integration capacitor 123.

The scan signal control unit 103 selectively and sequentially outputs a control signal to each scanning line 2 of the radiation image detector 110 to ON/OFF control the TFT switch 4 of each pixel, and the scan signal outputted to each scanning line 2 is controlled by a control signal inputted from the signal processing unit 130 to be described later.

The signal processing unit 130 includes the leak error correction means 140, A/D converter 150, and the like. The leak error correction means 140 performs correction on the analog image signals R detected by the signal detection section 120 based on the leak levels R. The leak error correction means 140 includes pairs of a first sample-and-hold circuit 131 and a second sample-and-hold circuit 132, each pair connected to each data line 3, in which a signal detected by each differential amplifier 121 when the TFT switches 4 of all of the scanning lines 2 are in OFF state, i.e., the analog leak level L is sampled and held by each of the first sample-and-hold circuits 131, and a signal detected by each differential amplifier 121 when the TFT switches are selectively switched ON on a scanning line-by-scanning line basis, i.e., the analog image signal R is sampled and held by each of the second sample-and-hold circuits 132.

Further, the leak error correction means 140 includes: a first multiplexer 133 connected to each of the first sample-and-hold circuits 131 and outputs a plurality of analog leak levels L held by the first sample-and-hold circuits 131 by selectively switching them to a subtraction circuit; a second multiplexer 134 connected to each of the second sample-and-hold circuits 132 and outputs a plurality of analog image signals R held by the second sample-and-hold circuits 132 by selectively switching them to the subtraction circuit; and a subtraction means 135, e.g., a subtraction circuit, that subtracts the analog leak level L inputted from the first multiplexer 133 from the analog image signal R inputted from the second multiplexer 134.

The A/D converter 150 converts the corrected analog image signal outputted from the leak error correction means 140 to digital image signal.

Figure 4:
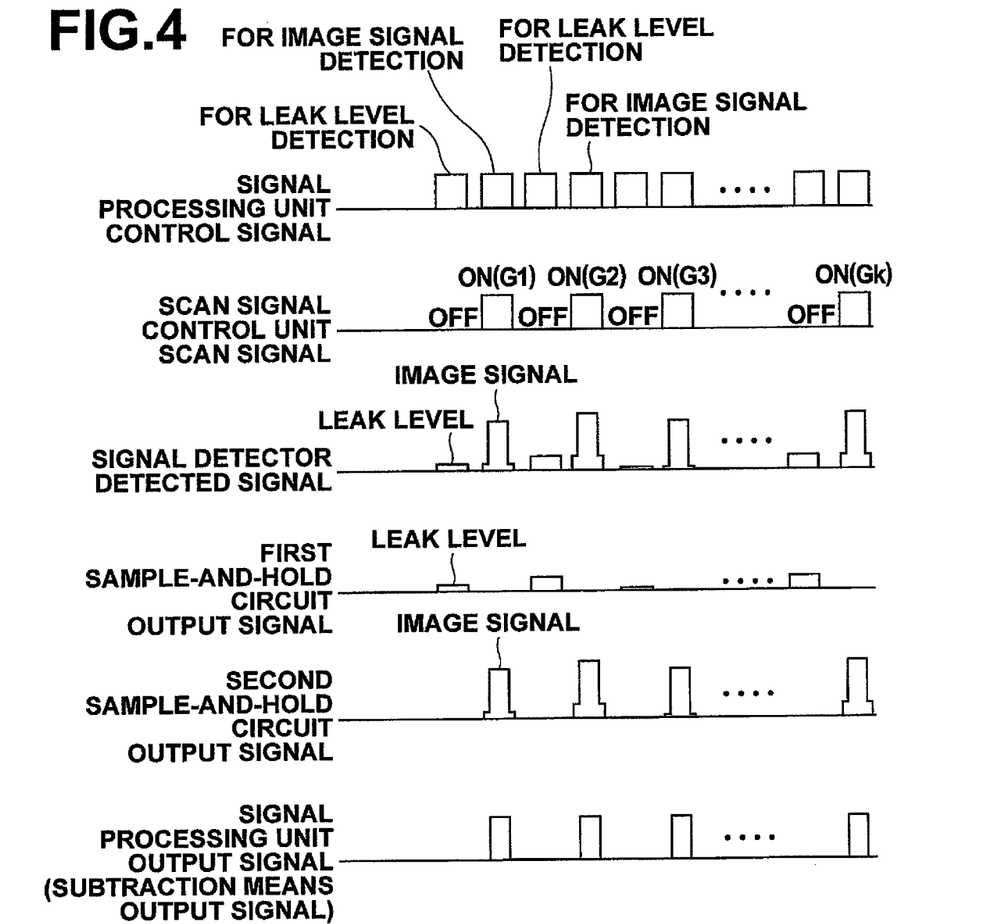
FIG. 4 is a timing chart illustrating an operation of the radiation image detection apparatus shown in FIG. 1.

Recording and reading out operations of the present radiation image detection apparatus will be described with reference to FIGS. 1 and 4. FIG. 4 is a timing chart illustrating an operation of the present radiation image detection apparatus.

When X-rays are irradiated on the radiation image detector 110 while a voltage is applied between the bias electrode 7 and Cs electrodes 14, X-ray image data are recorded on the detector 110. Charges generated in the semiconductor film 6 according to the amount of irradiated X-rays are collected by the charge collection electrodes 11 and stored in the capacitors electrically connected to the charge collection electrodes 11.

Then, as illustrated in FIG. 4, a control signal for leak level detection is outputted from the signal processing unit 130 to the signal detection section 120 and scan signal control unit 103, and a signal flowing out through each data line 3 when the TFT switches of each scanning line 2 is in OFF state is detected by each differential amplifier 121 connected to each data line 3. The detected signal detected by each differential amplifier 121 is outputted to the first sample-and-hold circuit 131 of the signal processing unit 130 connected to each differential amplifier 121 and held thereby as an analog leak level L. The leak level L obtained from each data line 3 and held by each of the first sample-and-hold circuit 131 is sequentially outputted to the subtraction means 135 in the order of the data lines by the first multiplexer 133.

Next, a control signal for image signal detection is outputted from the signal processing unit 130 to the scan signal control unit 103. In response to the control signal, a scan signal for switching ON the TFT switches 4 is outputted from the scan signal control unit 103 to the scanning line G1, and each of the TFT switches on the scanning line G1 is switched ON and a signal flows out to each data line 3 from each capacitor 5 on the scanning line G1. Further, the control signal for image signal detection is also outputted to the signal detection section 120 from the signal processing unit 130, and in response to the control signal, a signal flowing out through each data line 3 is detected by each differential amplifier 121 connected to each data line 3. The detected signal detected by each differential amplifier 121 is outputted to the second sample-and-hold circuit 132 of the signal processing unit 130 connected to each differential amplifier 121 and held thereby as an analog image signal R. The analog image signal R obtained from each data line 3 and held by each of the second sample-and-hold circuit 132 is sequentially outputted to the subtraction means 135 in the order of the data lines by the second multiplexer 134. Thereafter, the output of the control signal for image signal detection by the signal processing unit 130 is terminated and TFT switches on all of the scanning lines 2 are switched OFF.

Then, the analog leak level L detected by each data line 3 is subtracted from the analog image signal R detected by each corresponding data line 3 in the subtraction means 135. Thereby, a corrected analog image signal of each of the pixels connected to the scanning line G1 is obtained. The corrected analog image signal is outputted to the A/D converter 150.

When image signal reading for the scanning line G1 is completed, then image signal reading for the scanning line G2 is performed. First, as in the scanning line G1, the control signal for leak level detection is outputted from the signal processing unit 130 to the signal detection section 120 and scan signal control unit 103, and a signal flowing out through each data line 3 when the TFT switches of each scanning line 2 is in OFF state is detected by each differential amplifier 121 connected to each data line 3. The detected signal detected by each differential amplifier 121 is outputted to the first sample-and-hold circuit 131 of the signal processing unit 130 connected to each differential amplifier 121 and held thereby as an analog leak level L. The leak level L obtained from each data line 3 and held by each of the first sample-and-hold circuit 131 is sequentially outputted to the subtraction means 135 in the order of the data lines by the first multiplexer 133.

Next, a control signal for image signal detection is outputted from the signal processing unit 130 to the scan signal control unit 103. In response to the control signal, the scan signal for switching ON the TFT switches 4 is outputted from the scan signal control unit 103 to the scanning line G2, and each of the TFT switches on the scanning line G2 is switched ON and a signal flows out to each data line 3 from each capacitor 5 on the scanning line G2. Further, the control signal for image signal detection is also outputted to the signal detection section 120 from the signal processing unit 130, and in response to the control signal, a signal flowing out through each data line 3 is detected by each differential amplifier 121 connected to each data line 3. The detected signal detected by each differential amplifier 121 is outputted to the second sample-and-hold circuit 132 of the signal processing unit 130 connected to each differential amplifier 121 and held thereby as an analog image signal R. The analog image signal R obtained from each data line 3 and held by each of the second sample-and-hold circuit 132 is sequentially outputted to the subtraction means 135 in the order of the data lines by the second multiplexer 134. Thereafter, the output of the control signal for image signal detection by the signal processing unit 130 is terminated and TFT switches on all of the scanning lines 2 are switched OFF.

Then, the analog leak level L detected by each data line 3 is subtracted from the analog image signal R detected by each corresponding data line 3 in the subtraction means 135. Thereby, a corrected analog image signal of each of the pixels connected to the scanning line G2 is obtained. The corrected analog image signal is outputted to the A/D converter 150.

Thereafter, with respect to each of the scanning lines G3, - - -, Gk, the control signal for leak level detection and control signal for image signal detection are outputted alternately from the signal processing unit 130, and an analog leak level L and an analog image signal R of each pixel connected to each of the scanning lines G3, - - -, Gk are detected alternately by the signal detection section 120 in the same manner as described above. Then, the detected analog image signal R of each pixel and analog leak level L are held by the second sample-and-hold circuit 132 and first sample-and-hold circuit 131 of the leak error correction means 140 respectively, and in the subtraction means 135, the analog leak level L of each pixel detected through the data line 3 connected to the pixel when the TFT switch is in OFF state prior to switched ON and inputted from the first sample-and-hold circuit 131 through the first multiplexer 133 is subtracted from the analog image signal R of each corresponding pixel inputted from the second sample-and-hold circuit 132 through the second multiplexer 134. Then the corrected analog image signal of each pixel obtained by the subtraction is outputted to the A/D converter 150.

Then, the corrected analog image signal obtained by the leak error correction means 140 is converted to a digital image signal by the A/D converter 150, and outputted to an external device, such as the display 200, a printer, a video processing unit, or the like.

According to the embodiment described above, from the radiation image detector 110 including a charge generation layer that generates charges by receiving radiation and a detection layer stacked on top of another, the detection layer including: multitudes of pixels, each having a collection electrode for collecting the charges generated in the charge generation layer, a capacitor for storing the charges collected by the charge collection electrode, and a TFT switch for reading out the charges stored in the capacitor; multitudes of scanning lines for switching ON/OFF the TFT switches; and multitudes of data lines into which the charges stored in the capacitors flow in, an analog image signal R of each pixel flowing out through each data line 3 is detected by sequentially switching ON the TFT switches connected to each of the scanning lines on a scanning line-by-scanning line basis, and the detected analog image signal R is converted to a digital image signal and outputted. Here, in the radiation image detection method described above, an analog leak level L flowing out through each of the data lines 3 is detected with the TFT switches connected to each of the scanning lines 2 being switched OFF each time before the TFT switches are switched ON on a scanning line-by-scanning line basis, and the analog image signal R is corrected based on the leak level L before being converted to a digital image signal. In this way, the amount of error in the image signal caused by the leak currents may be corrected properly, and the reduction in the dynamic range of the corrected image signal may be prevented.

Figure 9A:
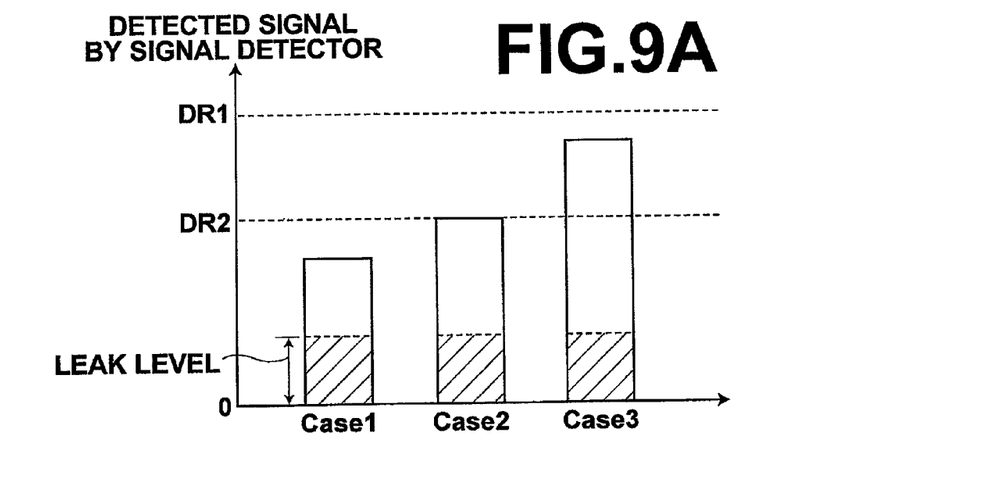
FIGS. 9A to 9C illustrate the reduction in the dynamic range of a conventional radiation image detector.
Figure 9B:
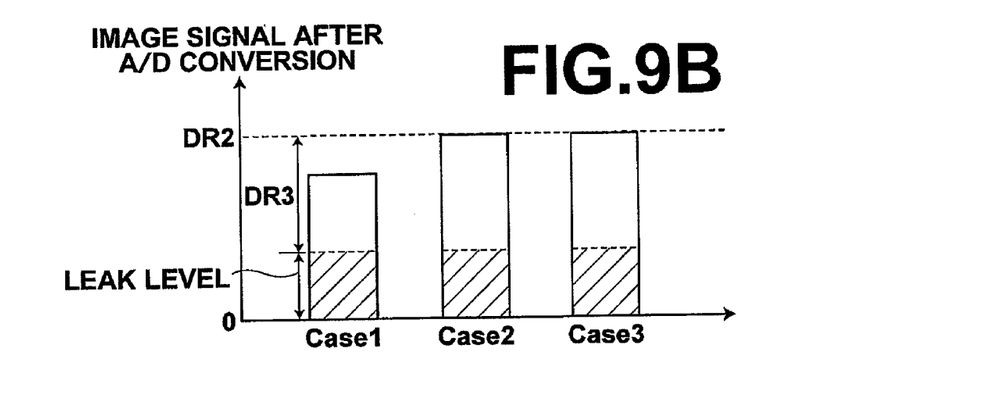
Figure 9C:
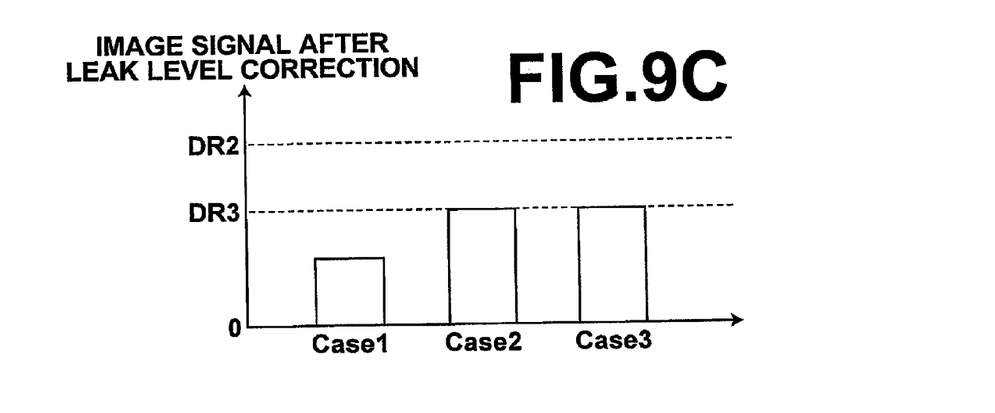

More specifically, in the conventional radiation image detection apparatus shown in FIG. 8, an analog image signal with a leak level superimposed thereon is detected by the signal detection section, as illustrated in the graph of FIG. 9A, and converted to a digital signal by the A/D converter. At that time, an image signal larger than the upper limit DR2 of the output dynamic range 0 to DR2 of the A/D converter is set to the upper limit value (saturated value) as illustrated in FIG. 9B. Then, as illustrated in FIG. 9C, the corrected image signal obtained by subtracting the leak level from the image signal outputted from the A/D converter takes a value within a second dynamic range from 0 to DR3 which is smaller that the original dynamic range of the A/D converter. Here, the upper limit value DR3 of the second dynamic range corresponds to a value obtained by subtracting the leak level L from the upper limit value DR2 of the original dynamic range of the A/D converter, so that a possible value range of the digital image signal, i.e., the second dynamic range is, in effect, further reduced as the leak level L becomes greater.

Figure 5A:
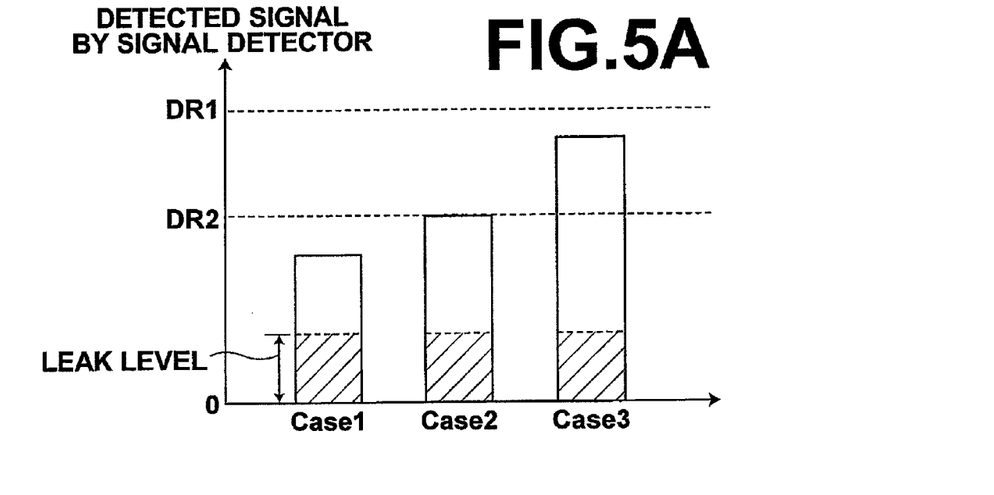
FIGS. 5A to 5C illustrate the dynamic range of the radiation image detection apparatus shown in FIG. 1.
Figure 5B:
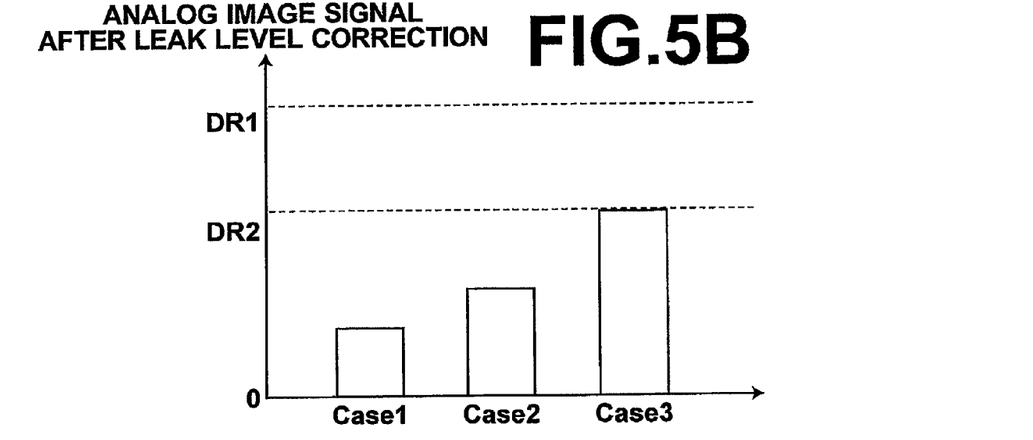
Figure 5C:
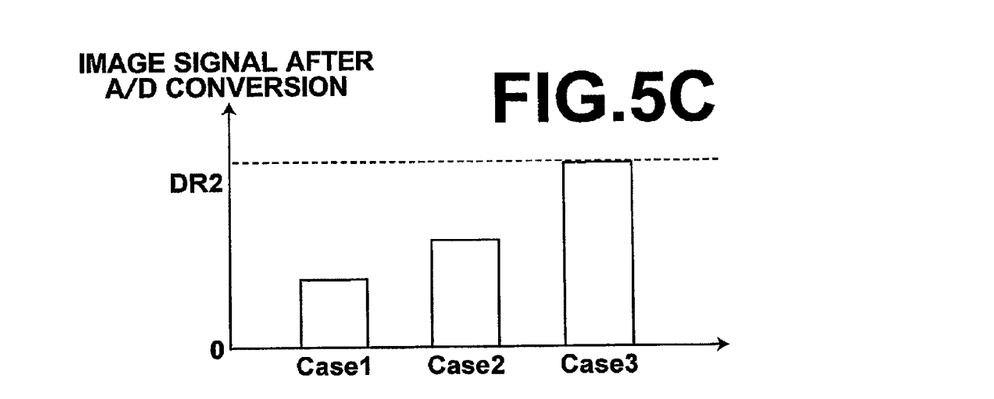

In contrast, in the radiation image detection apparatus of the present invention, an analog image signal with a leak level superimposed thereon is detected by the signal detection section, as illustrated in FIG. 5A. Then, leak error correction is performed by subtracting the leak level from the detected analog image signal before being converted to a digital image signal by the A/D converter, as illustrated in FIG. 5B. Thereafter, the corrected analog image signal is converted to a digital image signal by the A/D converter, as illustrated in FIG. 5C. This allows the corrected image signal to be represented using the entire output range of the A/D converter from zero to DR2 regardless of the magnitude of the leak level, thereby the reduction in the dynamic range of the corrected image signal may be avoided.

Figure 6:
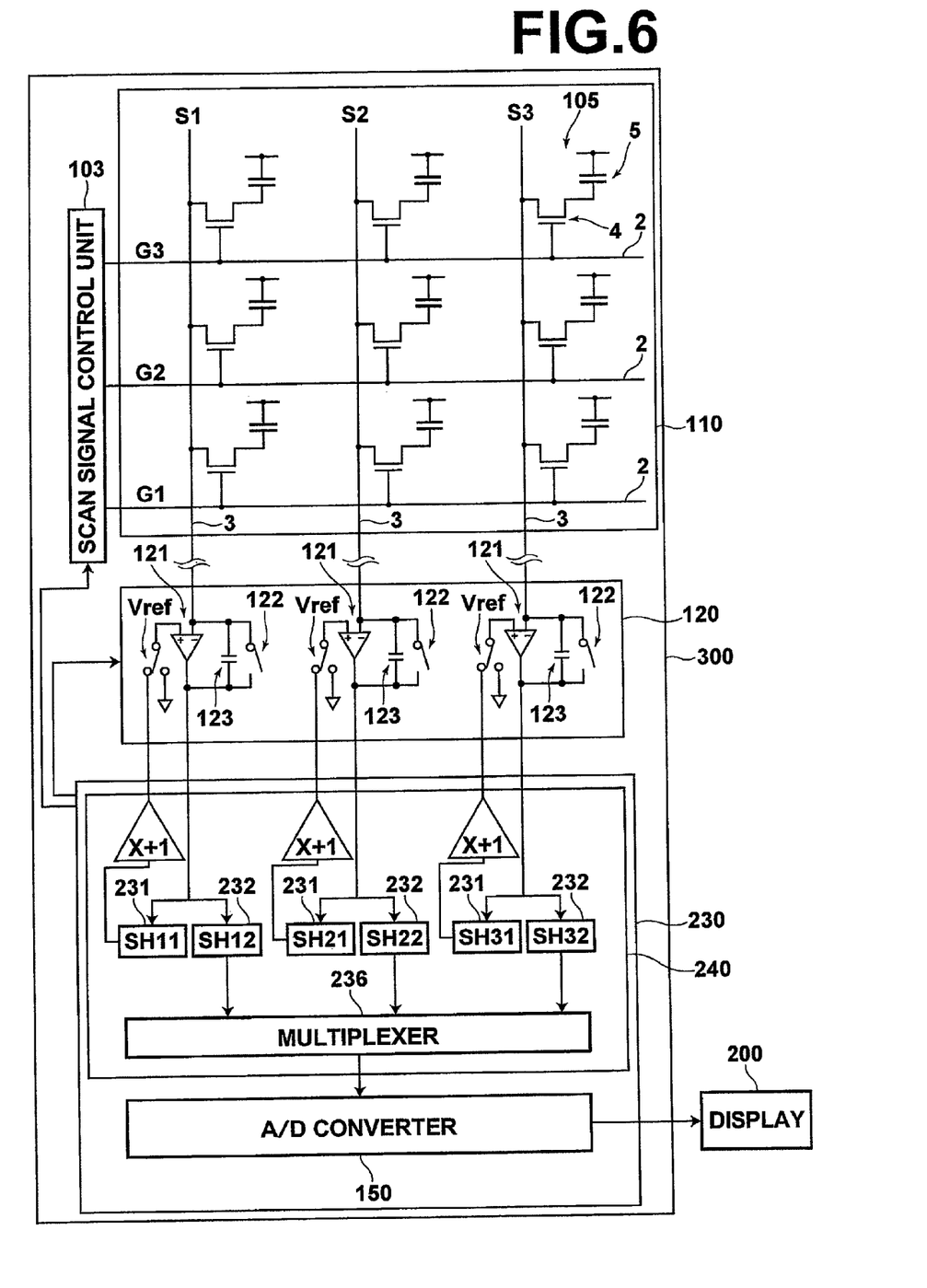
FIG. 6 is a schematic configuration diagram of a second embodiment of the radiation image detection apparatus of the present invention.
Figure 7:
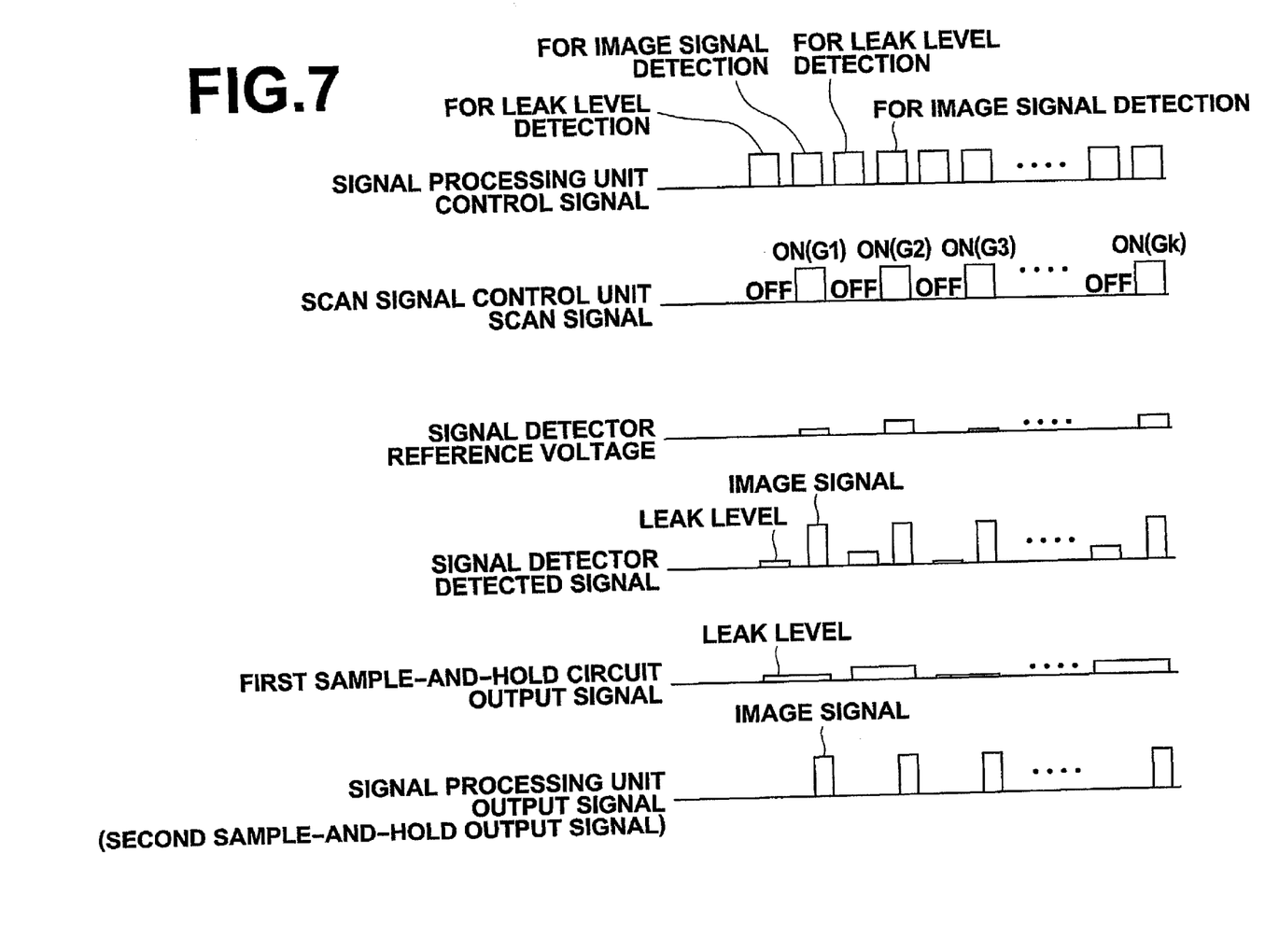
FIG. 7 is a timing chart illustrating an operation of the radiation image detection apparatus shown in FIG. 6.

Next, a second embodiment of the radiation image detection apparatus of the present invention will be described with reference to FIGS. 6 and 7. FIG. 6 is a schematic configuration diagram of the radiation image detection apparatus 300 according to a second embodiment of the present invention, and FIG. 7 is a timing chart illustrating an operation of the radiation image detection apparatus 300. In the radiation image detection apparatus 300 shown in FIG. 6, components identical to those of the radiation image detection apparatus 100 shown in FIG. 1 are given the same reference symbols and will not be elaborated upon further here. In the radiation image detection apparatus 300, a leak error correction means 240 controls the reference voltage Vref of each data line, which is referenced when obtaining an analog image signal R of each pixel on each data line 3, based on an analog leak level L detected from each data line 3 with the TFT switch 4 of each pixel being switched OFF, thereby offsetting an error component arising from the leak current before obtaining analog image signals R by switching ON the TFT switch 4 of each pixel.

More specifically, a control signal for leak level detection is outputted from a signal processing unit 230 to the signal detection section 120 and scan signal control unit 103, as illustrated in FIG. 6. In response to the control signal, the reference voltage Vref of each differential amplifier 121 of the signal processing unit 230 is set to an initial reference voltage, for example, ground voltage, and with the TFT switches 4 on each scanning line 2 being switched OFF, a signal flowing out through each data line 3 is detected by each differential amplifier 121 connected to each data line 3. The signal detected by each differential amplifier 121 is outputted to a first sample-and-hold circuit 231 of the signal processing unit 230 connected to each differential amplifier 121 and held as an analog leak level L. Then each held leak level L is buffered with plus one magnification and determined as the reference voltage Vref of each differential amplifier 121.

Next, a control signal for image signal detection is outputted from the signal processing unit 230 to the scan signal control unit 103, and in response to the control signal, a scan signal for sequentially switching ON the TFT switches 4 is outputted from the scan signal control unit 103 to the scanning line G1. The control signal for image signal detection is outputted from the signal processing unit 230 also to the signal detection section 120, and in response to the control signal, a signal flowing out through each data line 3 is detected by each differential amplifier 121 connected to each data line 3. Here, the signal detected by each differential amplifier 121 is a signal obtained by subtracting a leak level set as the reference voltage Vref from an analog image signal of each pixel connected to the scanning line G1 with the leak level of the data line being superimposed thereon. The signal detected by each differential amplifier 121 is outputted to a second sample-and-hold circuit 232 of the signal processing unit 230 connected to each differential amplifier 121 and held as an analog image signal R. The analog image signals R obtained from the respective data lines 3 and held by the respective second sample-and-hold circuits 232 are sequentially outputted to the A/D converter 150 by a multiplexer 236 in the order of the data line. Then, the output of the control signal for image signal detection from the signal processing unit 230 is terminated and TFT switches 4 on each scanning line 2 is switched OFF.

When image signal reading for the scanning line G1 is completed, then image signal reading for the scanning line G2 is performed. First, as in the scanning line G1, the control signal for leak level detection is outputted from the signal processing unit 230 to the signal detection section 120 and scan signal control unit 103. In response to the control signal, the reference voltage Vref of each differential amplifier 121 of the signal processing unit 230 is set to an initial reference voltage, and with the TFT switches 4 on each scanning line 2 being switched OFF, a signal flowing out through each data line 3 is detected by each differential amplifier 121 connected to each data line 3. The signal detected by each differential amplifier 121 is outputted to the first sample-and-hold circuit 231 of the signal processing unit 230 connected to each differential amplifier 121 and held as an analog leak level L. Then each held leak level L is buffered with plus one magnification and determined as the reference voltage Vref of each differential amplifier 121.

Next, the control signal for image signal detection is outputted from the signal processing unit 230 to the scan signal control unit 103, and in response to the control signal, the scan signal for sequentially switching ON the TFT switches 4 is outputted from the scan signal control unit 103 to the scanning line G2. The control signal for image signal detection is outputted from the signal processing unit 230 also to the signal detection section 120, and in response to the control signal, a signal flowing out through each data line 3 is detected by each differential amplifier 121 connected to each data line 3. The signal detected by each differential amplifier 121 is outputted to the second sample-and-hold circuit 232 of the signal processing unit 230 connected to each differential amplifier 121 and held as an analog image signal R. The analog image signals R obtained from the respective data lines 3 and held by the respective second sample-and-hold circuits 232 are sequentially outputted to the A/D converter 150 by the multiplexer 236 in the order of the data line. Then, the output of the control signal for image signal detection from the signal processing unit 230 is terminated and TFT switches 4 on each scanning line 2 is switched OFF.

Thereafter, with respect to each of the scanning lines G3, - - -, Gk, the control signal for leak level detection and control signal for image signal detection are outputted alternately from the signal processing unit 230 in the same manner as described above. Then, the reference voltage Vref of each differential amplifier 121 is controlled for the subsequent image signal detection based on an analog leak level flowing out and detected with the TFT switches 4 on each scanning line 2 being switched OFF and the reference voltage Vref of each differential amplifier 121 being set to the initial voltage, and with respect to each of the scanning lines G3, - - -, Gk, analog image signals of the respective pixels on the scanning line are sequentially read out by the signal detection section 120 and held by the respective second sample-and-hold circuits. The analog image signals R obtained from the respective data lines 3 and held by the respective second sample-and-hold circuits are sequentially outputted to the A/D converter 150 by the multiplexer 236 and converted to digital image signals.

In the radiation image detection apparatus 300 according to the second embodiment, a leak level removal operation for removing a leak level from an analog image signal of each pixel with an analog leak level superimposed thereon flowing out through each data line 3 of the radiation image detector is performed first, and then the analog image signal removed of the leak level is converted to a digital image signal, as in the radiation image detection apparatus 100 according to the first embodiment. In this way, the amount of error in the image signal caused by the leak current may be corrected properly, and the reduction in the dynamic range of the corrected image signal may be prevented. Further, an error corrected image signal may be obtained by estimating the amount of error in the image signal caused by the leak currents in advance and controlling the reference voltage used for the image signal detection.

Further, according to the radiation image detection apparatus 300 of the second embodiment, reduction in the dynamic range of the corrected analog image signal may also be avoided. For example, an assumption is made here for comparison where the dynamic range of the image signal detectable by the signal detection section 120 is from zero to DR1, and an analog image signal not including a leak level is smaller than the upper limit value DR1 of the dynamic range but greater than that when the leak level is superimposed thereon. In the radiation image detection apparatus 100 of the first embodiment, an analog image signal R with a leak level superimposed thereon and a leak level L are detected respectively by the signal detection section 120 first, then the leak level L is subtracted from the analog image signal R to obtain a corrected analog image signal. Consequently, if the analog image signal R is greater than the upper limit value (saturated value) DR1, the detected analog image signal is set to the upper limit value DR1, and the leak level L is subtracted from the detected analog image signal to obtain a corrected analog image signal. Accordingly, the dynamic range of the detected analog signal becomes smaller than the dynamic range of zero to DR1 with increase in the leak level L. In contrast, in the radiation image detection apparatus 300, the analog image signal detected by the signal detection section 120 is a corrected analog image signal not including a leak level, so that the dynamic range thereof is identical to the dynamic range of zero to DR1 of the signal detection section 120.

In each of the embodiments, the description has been made of a case in which the A/D converter is integrated in the radiation image detection apparatus, but it may be provided as a separate unit outside of the apparatus.

Further, in each of the embodiments described above, a correlated double sampling circuit for removing noise may be provided between the differential amplifier of the signal detection section and the sample-and-hold circuit of the signal processing unit.

What is claimed is:

1. A radiation image detection method for detecting from a radiation image detector including a charge generation layer that generates charges by receiving radiation and a detection layer stacked on top of another, the detection layer including: multitudes of pixels, each having a collection electrode for collecting the charges generated in the charge generation layer, a capacitor for storing the charges collected by the charge collection electrode, and a TFT switch for reading out the charges stored in the capacitor; multitudes of scanning lines for switching ON/OFF the TFT switches; and multitudes of data lines for transferring the charges stored in the capacitors, an analog image signal of each of the pixels flowing out through each of the data lines by sequentially switching ON the TFT switches connected to each of the scanning lines on a scanning line-by-scanning line basis, and converting the detected analog image signal to a digital image signal and outputting, wherein the method further comprises the steps of:

detecting an analog leak level flowing out through each of the data lines with the TFT switches connected to each of the scanning lines being switched OFF each time before switching ON the TFT switches on a scanning line-by-scanning line basis; and     correcting the analog image signal based on the leak level prior to the conversion.

2. A radiation image detection apparatus comprising:

a radiation image detector including a charge generation layer that generates charges by receiving radiation and a detection layer stacked on top of another, the detection layer including: multitudes of pixels, each having a collection electrode for collecting the charges generated in the charge generation layer, a capacitor for storing the charges collected by the charge collection electrode, and a TFT switch for reading out the charges stored in the capacitor; multitudes of scanning lines for switching ON/OFF the TFT switches; and multitudes of data lines for transferring the charges stored in the capacitors;

an image signal detection means that detects an analog image signal of each of the pixels flowing out through each of the data lines from the radiation image detector by sequentially switching ON the TFT switches connected to each of the scanning lines on a scanning line-by-scanning line basis;

an analog/digital conversion means that converts the detected analog image signal to a digital image signal;

a leak level detection means that detects an analog leak level flowing out through each of the data lines with the TFT switches connected to each of the scanning lines being switched OFF each time before the TFT switches are switched ON on a scanning line-by-scanning line basis; and     a correction means that corrects the analog image signal based on the leak level prior to the conversion.

3. The radiation image detection apparatus of claim 2, wherein the correction means is a means that subtracts the leak level detected from each of the data lines with the TFT switch of each of the pixels connected thereto being switched OFF before the TFT switch is switched ON from the analog image signal of each of the pixels.

4. The radiation image detection apparatus of claim 2, wherein:

the image signal detection means is a means that detects the analog image signal of each of the pixels by comparing a signal flowing out through each of the data lines when the TFT switches connected to each of the scanning lines are sequentially switched ON on a scanning line-by-scanning line basis with a predetermined reference voltage; and     the correction means is a means that control the reference voltage based on the analog leak level detected from each of the data lines to which each of the pixels are connected with the TFT switch thereof being switched OFF before the TFT switch is switched ON.

\* \* \* \* \*